US011104979B2

(12) United States Patent
Maderud et al.

(10) Patent No.: US 11,104,979 B2
(45) Date of Patent: Aug. 31, 2021

(54) THREE DIMENSIONAL PRINTING OF CERMET OR CEMENTED CARBIDE (71) Applicant: SANDVIK INTELLECTUAL PROPERTY AB, Sandviken (SE)

(72) Inventors: Carl-Johan Maderud, Stockholm (SE); John De Flon, Saltsjo-Duvnas (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 313 days.

(21) Appl. No.: 16/093,541

(22) PCT Filed: Apr. 6, 2017

(86) PCT No.: PCT/EP2017/058210
§ 371 (c)(1),
(2) Date: Oct. 12, 2018

(87) PCT Pub. No.: WO2017/178319
PCT Pub. Date: Oct. 19, 2017

(65) Prior Publication Data
US 2019/0161837 A1    May 30, 2019

(30) Foreign Application Priority Data
Apr. 15, 2016  (EP) .................................... 16165640

(51) Int. Cl.
B22F 3/15       (2006.01)
C22C 29/06      (2006.01)
(Continued)

(52) U.S. Cl.
CPC ............ C22C 29/06 (2013.01); B22F 1/0011 (2013.01); B22F 1/0059 (2013.01);
(Continued)

(58) Field of Classification Search
None
See application file for complete search history.

(56) References Cited

U.S. PATENT DOCUMENTS

| 5,775,402 A * | 7/1998 | Sachs ...................... B22F 10/00 |
| | | 164/4.1 |
| 2014/0087210 A1* | 3/2014 | Keane ...................... B22F 3/02 |
| | | 428/810 |

(Continued)

FOREIGN PATENT DOCUMENTS

| EP | 2465960 A1 | 6/2012 |
| WO | 2015073081 A1 | 5/2015 |
| WO | 2015162206 A2 | 10/2015 |

OTHER PUBLICATIONS

Kernan et al. "Three dimensional printing of tungsten carbide-10 wt% cobalt using cobalt oxide precursor", International Journal of Refractory Metals and Hard Materials, vol. 25, pp. 82-94, 2007.

(Continued)

Primary Examiner — George Wyszomierski
(74) Attorney, Agent, or Firm — Corinne R. Gorski (57) ABSTRACT

The present invention relates to a powder mixture for three-dimensional (3D) printing of a cermet or a cemented carbide body. The powder mixture includes 65-85 wt % of porous cemented carbide or cermet particles of a median particle size (D50) of 10-35 µm, and 15-35 wt % of a dense cemented carbide or cermet particles of a median particle size (D50) of 3-10 µm. The present invention also relates to a method of making a cermet or cemented carbide body, the method including the steps of forming the powder mixture, 3D printing a body using the powder mixture and a printing binder and thereby forming a 3D printed cermet or cemented carbide green body and sintering the green body and to form a cermet or cemented carbide body.

4 Claims, 6 Drawing Sheets

(51) Int. Cl.
    *C22C 1/05*     (2006.01)
    *B22F 10/10*     (2021.01)
    *B33Y 10/00*     (2015.01)
    *B33Y 70/00*     (2020.01)
    *B22F 1/00*     (2006.01)
    *B23B 27/14*     (2006.01)
    *B23C 5/16*     (2006.01)
    *B24D 3/00*     (2006.01)
    *B22F 3/10*     (2006.01)
    *E21C 35/183*     (2006.01)
    *E21B 10/46*     (2006.01)
    *B33Y 80/00*     (2015.01)
    *B22F 5/00*     (2006.01)

(52) U.S. Cl.
    CPC .............. *B22F 3/1021* (2013.01); *B22F 3/15* (2013.01); *B22F 10/10* (2021.01); *B23B 27/148* (2013.01); *B23C 5/16* (2013.01); *B24D 3/008* (2013.01); *B33Y 10/00* (2014.12); *B33Y 70/00* (2014.12); *C22C 1/051* (2013.01); *B22F 2005/001* (2013.01); *B22F 2207/03* (2013.01); *B22F 2301/15* (2013.01); *B22F 2302/10* (2013.01); *B22F 2304/10* (2013.01); *B23B 2222/16* (2013.01); *B23C 2222/16* (2013.01); *B33Y 80/00* (2014.12); *E21B 10/46* (2013.01); *E21C 35/183* (2013.01); *E21C 35/1835* (2020.05)

(56) References Cited

U.S. PATENT DOCUMENTS

| | | | |
|---|---|---|---|
| 2015/0147572 A1 | 5/2015 | Sato et al. | |
| 2016/0375493 A1* | 12/2016 | Stoyanov | B33Y 10/00 419/6 |
| 2018/0236538 A1* | 8/2018 | Gibson | B22F 10/00 |
| 2019/0001414 A1* | 1/2019 | Konyashin | C22C 1/051 |
| 2020/0346365 A1* | 11/2020 | Wang | B22F 1/0014 |

OTHER PUBLICATIONS

Hashe et al. "Characterization of WC-(W,V)C-Co made from pre-alloyed (W,V) C", International Journal of Refractory Metals and Hard Materials, Elsevier, Amsterdam,NL. vol. 27, No. 2, Mar. 1, 2009, pp. 229-233.

* cited by examiner

THREE DIMENSIONAL PRINTING OF CERMET OR CEMENTED CARBIDE

RELATED APPLICATION DATA

This application is a § 371 National Stage Application of PCT International Application No. PCT/EP2017/058210 filed Apr. 6, 2017 claiming priority to EP 16165640.0 filed Apr. 15, 2016.

TECHNICAL FIELD

The present invention relates to a method of three dimensional printing of a cermet or cemented carbide body. The present invention also relates to a powder mixture to be used in three dimensional printing. The powder mixture comprises a mixture of dense and porous cermet and/or cemented carbide powders.

BACKGROUND ART

Three dimensional (3D) printing or additive manufacturing is a promising manufacturing technique that makes it possible to print a three dimensional body from a powder. A model of the body is typically created in a computer program and this model is then printed in a three dimensional printing machine or apparatus. Three dimensional printing is a promising manufacturing technique because it makes it possible to produce complex structures and bodies that cannot be achieved via conventional manufacturing processes.

One type of three dimensional printing is based on binder jetting wherein an ink jet type printer head is used to spray binder onto a thin layer of powder, which, when set, forms a sheet of glued together powder for a given layer of an object. After the binder is set, a next thin layer of powder is spread over the original layer, and the printed jetting of binder is repeated in the pattern for that layer. The powder that was not printed with the binder remains where it was originally deposited and serves as a foundation and as support for the printed structure. When printing of the object is complete, the binder is cured at an increased temperature and subsequently the powder not printed with binder is removed by for example an air stream or brushing.

Cermet and cemented carbide materials consist of hard constituents of carbides and/or nitrides such as WC or TiC in a metallic binder phase of for example Co. These materials are useful in high demanding applications due to their high hardness and high wear resistance in combination with a high toughness. Examples of areas of application are cutting tools for metal cutting, drill bits for rock drilling and wear parts.

There is a need to find a successful method of three dimensional printing of cermet and cemented carbide bodies. One of the difficulties is that the final product needs to be very homogeneous in structure and in composition. Another is that the density of pores needs to be very limited.

"*Three dimensional printing of tungsten carbide-10 wt % cobalt using cobalt oxide precursor*" by Kernan et al, International Journal of Refractory Metals and Hard Materials 25 (2007), p. 82-94, discloses a slurry-based three dimensional printing of cemented carbide insert using cobalt oxide that is reduced into cobalt metal during a sintering step.

SUMMARY OF THE INVENTION

It is an objective of the present invention to provide a powder mixture that is suitable to use in three dimensional printing of cermet or cemented carbide bodies.

It is a further object of the present invention to provide a method of making a three dimensional (3D) printed cermet or cemented carbide with a homogeneous composition and with a minimum of pores.

The present invention relates to a powder mixture for three dimensional printing of a cermet or cemented carbide body, wherein said powder mixture comprises 65-85 wt %, preferably 65-75 wt %, porous cemented carbide and/or cermet particles of a median particle size (D50) of 10-35 µm, preferably 10-25 µm, more preferably 15-20 µm, and 15-35 wt %, preferably 25-35 wt %, dense cemented carbide and/or cermet particles of a median particle size (D50) of 3-10 µm, preferably 4-10 µm, more preferably 4-8 µm.

The powder mixture of the present invention has shown advantages in that three dimensional bodies of cermet or cemented carbide can be printed successfully with satisfying properties relating to porosity and/or metallic binder phase enriched zones. It has been found that the content of dense particles and porous particles and their particle size are important for the final density and homogeneity of the cermet or cemented carbide body. The porous particles are needed to add enough sintering activity to the three dimensional printed green body. Generally it is known that smaller particles contribute more to sintering activity than larger particles. It has now been found that a specific fraction of porous particles can add enough sintering activity to achieve a successfully 3D printed cermet or cemented carbide body.

Furthermore it has been found that the green strength of the printed green body can be increased to a sufficient level if the powder mixture comprises dense cermet or cemented carbide particles. If the powder mixture comprises more than 35 wt % dense particles, the flow of the powder mixture during printing will be insufficient. If the amount of dense particles is lower than 15 wt % the green strength of the printed green body will be insufficient. An addition of dense fine particles also contribute in sintering activity and thereby contribute to reduced residual porosity. The dense particles contributes with an increased printing binder (glue) locking of the powder mixture during the printing so that the green strength become sufficient.

The powder mixture of the present invention is a mixture comprising dense cemented carbide or cermet particles and porous cermet or cemented carbide particles. The powder mixture may in one embodiment further comprise additional particles of a median particle size (D50) of less than 10 µm, preferably 2-10 µm, more preferably 2-8 µm, most preferably 3-8 µm. For example particles of metallic binder phase such as Co, carbon particles and/or hard constituents such as WC can be added to the powder mixture.

The three dimensional printing of a cermet or cemented carbide body may result in a body of any shape suitable for its purpose. Cermet and the cemented carbide both comprise hard constituents in a metallic binder phase. In the case of cemented carbide, at least a portion of the hard constituents consists of WC. In one embodiment of the present invention the number and size of pores in the three dimensional printed and sintered cermet or cemented carbide body is lower than A06 and/or B06 as defined in ISO4505-1978, preferably lower than A04 and/or B04 more preferably lower than A02 and/or B02. In one embodiment of the present invention the number and size of pores in the three dimensional printed and sintered cermet or cemented carbide body is lower than A02B00C00, A00B02C00 or A02B02C00. In one embodiment of the present intention no pores are present in the three dimensional printed and sintered cermet or cemented carbide body.

The term dense particle is herein intended to define a particle with less than 1 vol % pores. The term porous particle is herein intended to define a particle with equal to or more than 1 vol % pores.

In one embodiment of the present invention the average porosity of the porous particles is 10-40 vol %, or 15-35 vol %, or 17-30 vol % or 18-30 vol %. The porosity in the porous particles contributes to the sintering activity during the sintering of the printed green body. If the porosity of the porous particles is too low the sintering activity in the green body during sintering will be reduced and residual porosity and/or open porosity might appear after the sintering step. If the porosity of the porous particles is too high the green body will be relatively fragile. The reason to this is probably that capillary forces cause a sucking up of printing binder into the porous particles, leaving less printing binder at the surface of each porous particle and thereby causing a weaker connection to other particles.

In one embodiment of the present invention the powder mixture comprise porous cemented carbide or cermet particles of a median particle size (D50) of 15-20 µm and the average porosity of said porous particles is more than 17 vol %, or more than 18 vol %, or 17-40 vol % or 18-35 vol %.

In one embodiment of the present invention the D90 of the porous particles is <40 µm, preferably <30 µm. This is advantageous since large porous particles tend to contribute in the formation of metallic binder phase enriched zones in the sintered cermet or cemented carbide body. The sintered cermet or cemented carbide body ideally consists of a material composed of hard constituents such as WC in a metallic binder phase, wherein the metallic binder phase is evenly distributed inside the body and wherein metallic binder phase enriched zones are less pronounced, negligible or even difficult to find.

In one embodiment of the present invention the D90 of the dense particles is <20 µm, preferably <15 µm.

In one embodiment of the present invention the powder mixture comprises spherical porous particles. Spherical particles have a better flowing property and this is advantageous both during the printing and after the printing in the depowdering step when the loose powder is to be removed from the printed powder, i.e. from the 3D printed cermet or cemented carbide green body. If the green body comprises a lattice structure or a cavity, the depowdering step can be quite demanding and then a powder mixture comprising spherical particles is an advantage.

In one embodiment of the present invention the preceding claims wherein powder mixture comprises crushed or irregularly shaped dense particles. An irregular outer shape of the dense particles is advantageous in that it provides stability to the powder bed during the printing.

In one embodiment of the present invention the cermet and/or cemented carbide particles comprise a metallic binder phase and wherein the average content of metallic binder phase in the powder mixture is higher than 10 or higher than 11 wt %, preferably 11-13 wt %. A metallic binder phase content within this range is advantageous in that the density of pores in the sintered cermet or cemented carbide body may be very limited.

In one embodiment of the present invention the cermet and/or cemented carbide particles comprise a metallic binder phase and said metallic binder phase comprises Co. In one embodiment of the present invention the metallic binder phase comprises more than 90 wt % Co. In one embodiment of the present invention the metallic binder phase consists of Co.

In one embodiment of the present invention the cemented carbide particles comprises WC and wherein the average WC grain size is 0.5-10 µm, preferably 0.5-5 µm or 0.5-2 µm.

The present invention also relates to a method of making a cermet or cemented carbide body, said method comprising the steps of:
  mixing a powder of porous cermet and/or cemented carbide particles of an median particle size (D50) of 5-35 µm with a powder of dense cermet and/or cemented carbide particles of a median particle size (D50) of 3-15 µm, and thereby form a powder mixture, wherein the powder mixture comprises 65-85 wt %, preferably 65-75 wt %, porous particles and 15-35 wt %, preferably 25-35 wt % dense particles,
  3D printing a body using said powder mixture and a printing binder and thereby form a 3D printed cermet or cemented carbide green body,
  sintering said green body and thereby form a cermet or cemented carbide body.

The printing binder comprises a solvent that partly evaporates during the printing. The printing binder can be water-based.

Curing is normally performed as a part of the printing step. The printing binder is cured whereby the green body gets a sufficient green strength. The curing can be performed by subjecting the printed green body to an increased temperature, such as 150-250° C. before removal of the excessive powder. In one embodiment the curing is performed in a non-oxidation environment such as in Ar.

In one embodiment the three dimensional printing is performed in a three dimensional printing machine such as a binder jet three dimensional printing machine.

In one embodiment the sintering is performed in a sintering furnace.

In one embodiment of the present invention the method further comprise a step of, subsequent to or integrated into the sintering step, a step of so called sinter-HIP or GPS (gas pressure sintering) the cermet or cemented carbide body. The sinter-HIP may be performed at a temperature of 1300-1500° C. The sinter-HIP may be performed at a pressure of 20-100 bar. Subsequent to for example a normal vacuum sintering, a pressure is applied at increased temperature. The aim of the sinter-HIP step is to reduce any porosity left after the sintering by densifying the material. Any closed porosity in the sintered body are encapsulated and the applied pressure will provide a low-pressure HIPing (i.e. sinter-HIPing) reducing the porosity. Open porosity can on the other hand not be reduced using sinter-HIP.

In one embodiment of the present invention the three dimensional printing is a binder jetting. Binder jetting is advantageous in that it is a relatively cheap three dimensional printing method.

A step of grinding or polishing the body can be added as a final step after the sintering step.

The present invention also relates to the use of said powder mixture in three dimensional printing of a cutting tool for metallic cutting such as an insert, a drill or an end mill, or a cutting tool for mining application such as a drill bit, or a wear part.

The present invention also relates to a three dimensional printed green body comprising cermet and/or cemented carbide particles of which 65-85 wt % are porous cemented carbide and/or cermet particles of a median particle size (D50) of 10-35 μm, and 15-35 wt % are dense cemented carbide and/or cermet particles of a median particle size (D50) of 3-10 μm.

The present invention also relates to a three dimensional printed body of cermet or cemented carbide with a microstructure of the classification A00B00C00.

In one embodiment, the sintered cermet or cemented carbide body has a metallic binder phase content >11 wt %.

In one embodiment, the sintered cermet or cemented carbide body is a cutting tool for metal cutting.

Still other objects and features of the present invention will become apparent from the following detailed description considered in conjunction with the accompanying drawings.

DEFINITIONS

The term "cermet" is herein intended to denote a material comprising hard constituents in a metallic binder phase, wherein the hard constituents comprise carbides or carbonitrides of one or more of Ta, Ti, Nb, Cr, Hf, V, Mo and Zr, such as TiN, TiC and/or TiCN.

The term "cemented carbide" is herein intended to denote a material comprising hard constituents in a metallic binder phase, wherein the hard constituents comprise WC grains. The hard constituents can also comprise carbides or carbonitrides of one or more of Ta, Ti, Nb, Cr, Hf, V, Mo and Zr, such as TiN, TiC and/or TiCN.

The metallic binder phase in the cermet or in the cemented carbide is a metal or a metallic alloy, and the metal can for example be selected from Cr, Mo, Fe, Co or Ni alone or in any combination. Preferably the metallic binder phase comprises a combination of Co, Ni and Fe, a combination of Co and Ni, or only Co. The metallic binder phase can comprise other suitable metals as known to the skilled person.

The particle sizes distribution is herein presented by D10, D50 and D90 values. The D50, the median, is defined as the particle diameter where half of the population has a size smaller than this value. Similarly, 90 percent of the distribution is smaller than the D90 value, and 10 percent of the population is smaller than the D10 value.

EXAMPLES

Embodiments of the present invention will be disclosed in more detail in connection with the following examples. The examples are to be considered as illustrative and not limiting embodiments.

Figure 5:
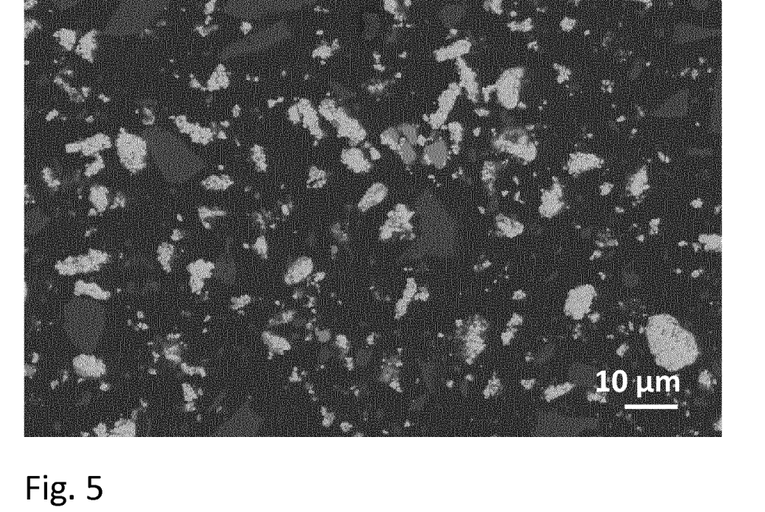
FIG. 5. A SEM (Scanning Electron Microscope) image of a cross section of dense particles of DP2.

The dense powder DP1 is a recycled WC-Co powder with product code Grade F (fine) from Tikomet Oy. The dense powder DP2 also a recycled WC-Co powder, produced as Grade F by Tikomet Oy, but milled to a slightly finer grain size. A cross section of the powder DP2 is shown in FIG. 5.

Figure 6:
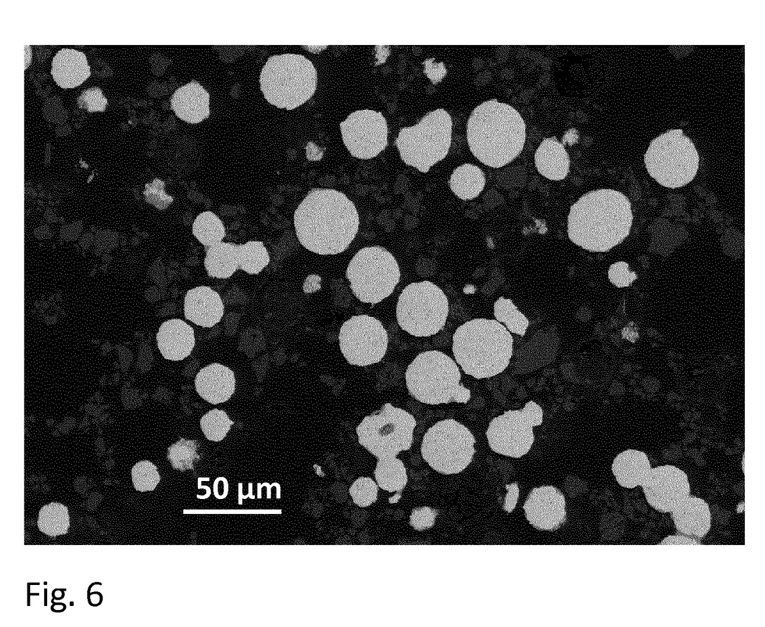
FIG. 6. A SEM image of a cross section of dense particles of DP3.

The DP3 is a powder produced by spray drying granules of WC, Co and PEG and sintering of the spray dried granules. The sintering is performed to remove the PEG and also to remove the porosity and thereby provide dense cemented carbide particles of a spherical shape. The method of making the DP3 powder is disclosed in further detail in WO2015/162206. A cross section of the powder DP3 is shown in FIG. 6. The porosity can be adjusted in the sintering step and the particle size distribution can be adapted in a subsequent sieving step or air-classifier step.

DP4 is a cobalt powder that is used to adjust the cobalt content in the final cemented carbide body. The DP4 powder is a R-125 cobalt powder d25/450 of the material 20060 from Freeport Cobalt.

Figure 3:
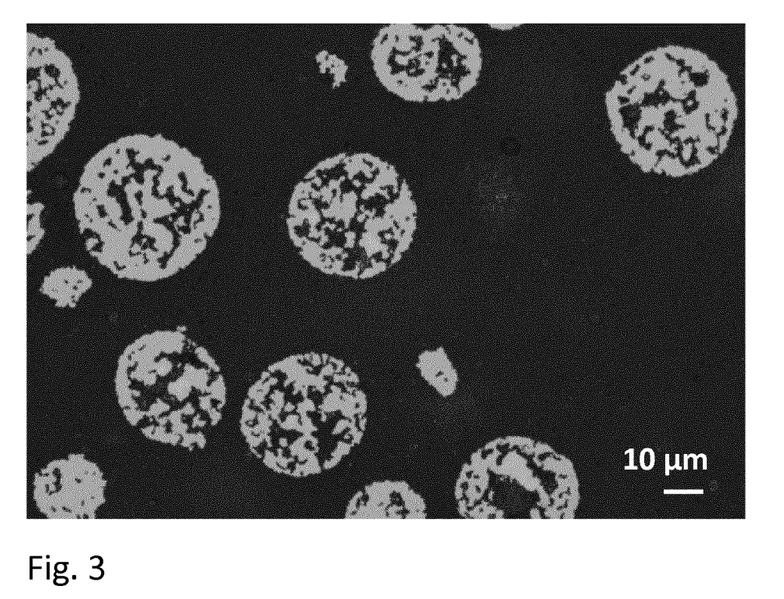
FIG. 3. A LOM image of a cross section of porous particles of PP1.
Figure 4:
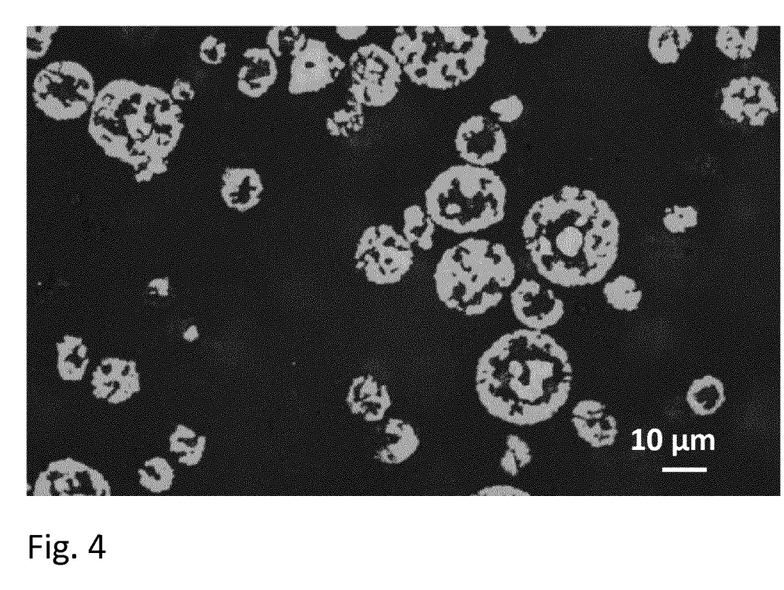
FIG. 4. A LOM image of a cross section of porous particles of PP2.

The porous powders PP1 and PP2 are so called "Amperit 519" WC-Co 88/12 from H. C. Starck. PP1 is agglomerated sintered 45/15 μm Amperit 519.074 and PP2 agglomerated sintered 30/5 μm Amperit 519.059. Cross sections of PP1 and PP2 are shown in FIG. 3 and FIG. 4, respectively.

The PP3 is a porous powder produced by spray drying granules of WC, Co and PEG and partial sintering of the spray dried granules. The partial sintering is performed to remove the PEG and thereby provide porous cemented carbide particles of a spherical shape.

The porosity measurement was performed by studying the through-cut and image analysis with ImageJ. (Open source software https://imagej.nih.gov/ij/index.html).

The shape of the particles was studied in SEM (Scanning Electron Microscope) and in LOM (Light Optical Microscope). The particle size distribution (D10, D50 and D90) were analyzed with Sympatec HELOS/BR Particle size analysis with laser diffraction and RHODOS dry dispersing system. The shape that most of the particles have in each powder is presented in Table 1.

The Co content and the Cr content were studied in ICP-MS or XRF. The results are presented in Table 1. The cemented carbide powders also comprise WC in the amount adding up to 100% from the Co and/or Cr values in the table 1.

TABLE 1

Dense and porous powders

| Powder | Co (wt %) | Cr (wt %) | D10 μm | D50 μm | D90 μm | Porosity (%) | Shape of particles |
|---|---|---|---|---|---|---|---|
| DP1 | 9.8 | 0.41 | 1.3 | 6.1 | 11.9 | 0 | crushed |
| DP2 | 8.2 | 0.27 | 1.2 | 4.7 | 8.8 | 0 | crushed |
| DP3 | 12.9 | 0.56 | 18.7 | 28.5 | 45.8 | 0 | Sperical |
| DP4 | 100 | — | 1.6 | 3.3 | 6.5 | — | Rod-like |
| PP1 | 11.9 | 0.01 | 22.7 | 33.5 | 47.1 | 27 | Sperical |
| PP2 | 11.7 | — | 10.9 | 18.2 | 28.2 | 29 | Spherical |
| PP3 | 12.9 | 0.57 | 16.6 | 28.9 | 41.8 | 18 | Spherical |

Powder mixtures were produced by mixing dense and porous powder into the powder mixtures as shown in table 2.

Printing was performed in a binder jetting printing machine "ExOne X1-lab" with a layer thickness during printing of 100 µm. Saturation during printing was between 80% and 110% as shown in Table 2. The saturation of printing binder is defined as the percent of the void volume that is filled with printing binder at a specified powder packing density (here the powder packing density is set to 60%). A higher saturation is needed when printing with a powder mixture comprising a larger fraction of porous particles as compared to a lower fraction of porous particles. Water based printing ink X1-Lab™ Aqueous Binder (7110001CL) was used as printing binder. During the printing the sequence for each layer was as follows: a layer of the powder mixture was spread over the bed, printing binder was spread in a pattern as defined in a CAD model, followed by drying of the printing binder to remove the solvent of the printing binder. This was repeated until the full height of the body was printed. Thereafter curing was done for 8 hours at 195° C. in argon atmosphere. Depowdering was done manually using a small brush and pressurized air.

The printed and cured green bodies were subsequently sintered to provide sintered cemented carbide bodies. The sintering was done at Y-coated graphite trays in a DMK80 sintering furnace. In a first sintering process the bodies were subjected to a debinding step where the temperature was increased from room temperature up to 480° C. in a sintering chamber with a $H_2$ flow of 500 l/hour. This was followed by a vacuum step where the temperature was increased from 480° C. to 1380° C. where it was hold for 30 minutes. Thereafter the temperature was increased to 1410° C. where it was hold for one hour. Thereafter the chamber was cooled down and the sintered bodies removed from the chamber.

The sintered bodies (sample A-F, not sample G) were then subjected to a HIP-sintering process including a step of holding the temperature at 1410° C. for 30 minutes followed by a pressurized step where Ar was introduced into the chamber during approximately 13 minutes to reach the pressure 55 bar, and thereafter holding this pressure for 15 minutes. The chamber was thereafter cooled down and the sintered and HIP-sintered bodies removed from the chamber The linear shrinkage of each sample was about 25-30% from green body to the sintered and HIP-sintered body. A cross section of each sintered and HIP-sintered sample was studied and comments are listed in table 2. Porosity was investigated both by cemented carbide ABC-judgment according to ISO4505-1978 and image analysis with ImageJ.

TABLE 2

Powder mixtures and printed samples

Figure 1:
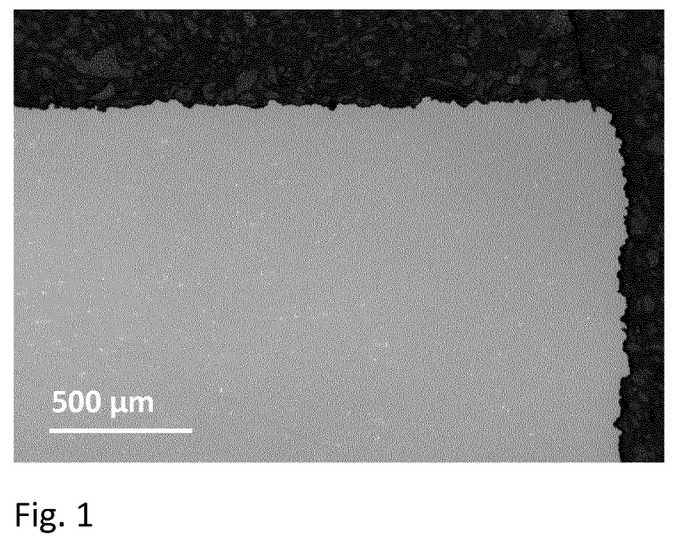
FIG. 1. A LOM (light optical microscope) image of a cross section of Sample B. No pores are visible in the image.
Figure 2:
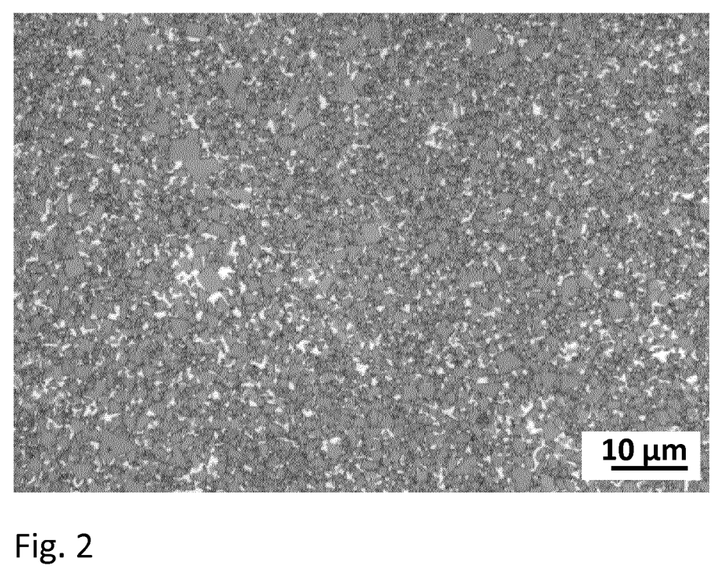
FIG. 2. A LOM image of a cross section of Sample B, where the microstructure is visible. The WC grains are grey in color and Co metallic binder phase is white.
Figure 7:
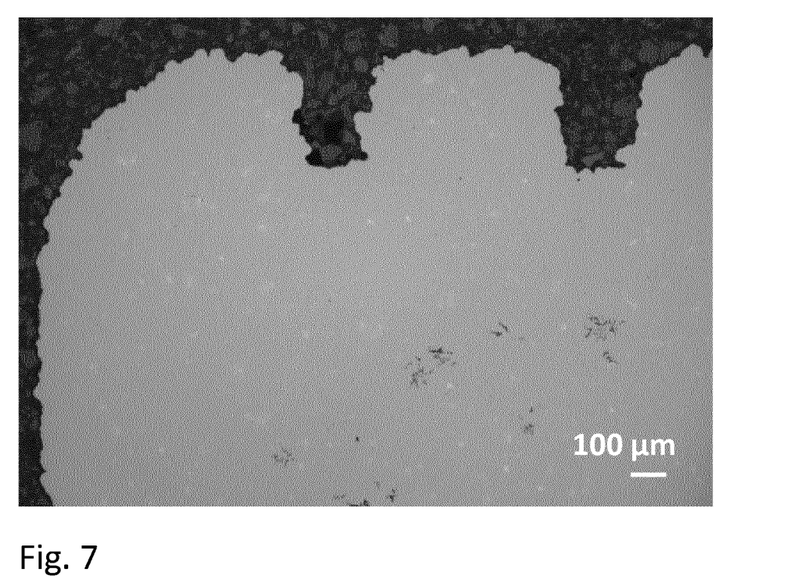
FIG. 7. A LOM image of a cross section of Sample D. Graphite is visible as dark areas in the image.
Figure 8:
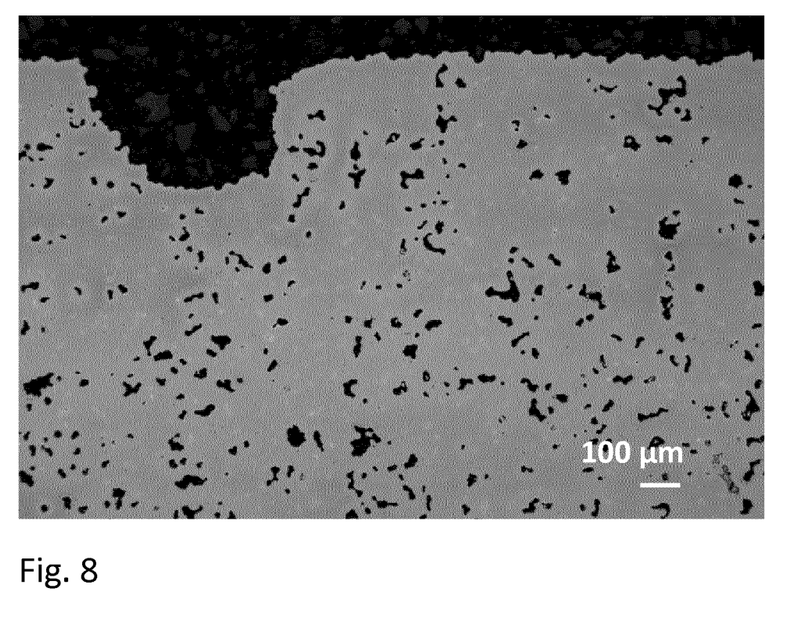
FIG. 8. A LOM image of a cross section of Sample E. Pores are visible as dark areas in the image.
Figure 9:
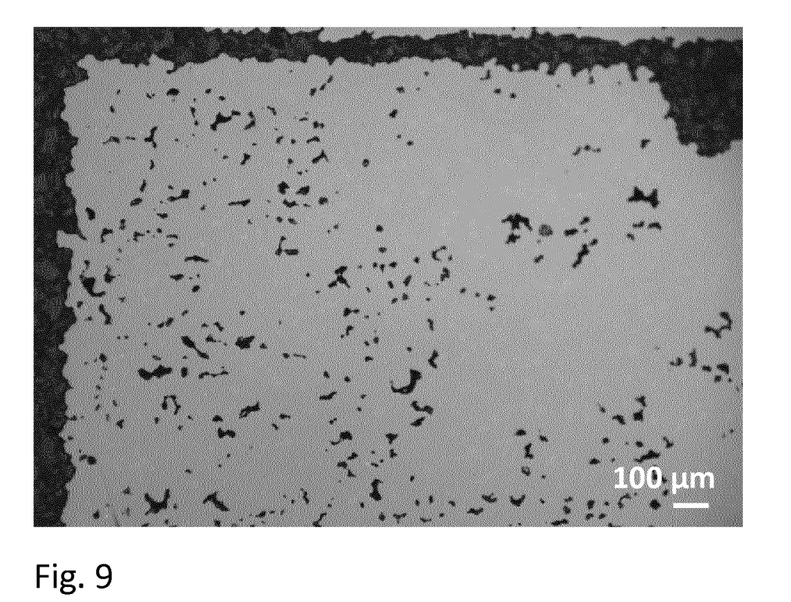
FIG. 9. A LOM image of a cross section of Sample F. Pores are visible as dark areas in the image.
Figure 10:
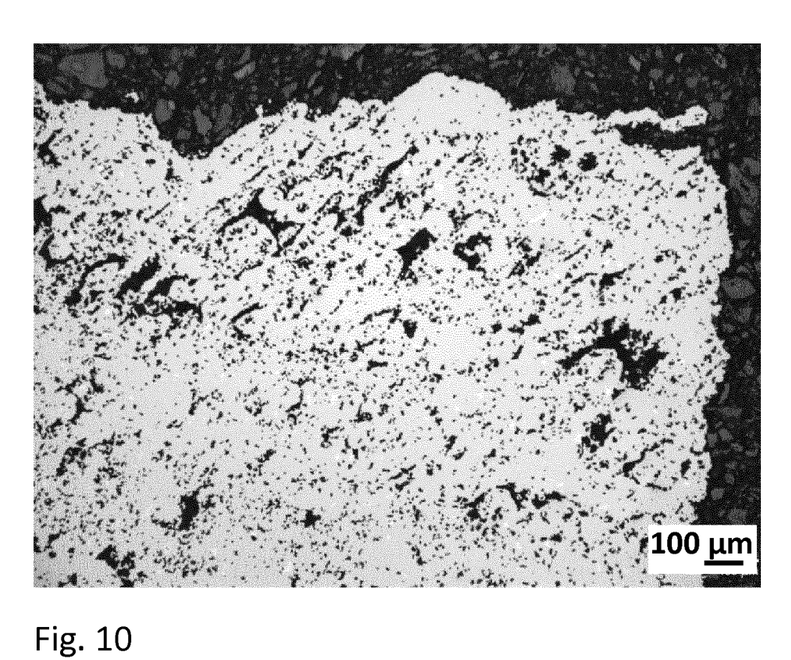
FIG. 10. A LOM image of a cross section of Sample G. Pores are visible as dark areas in the image.

| Printed sample ref. no. | Powder mixture | Porous powder | Dense powder | Saturation during printing (%) | Co content (wt %) | Comment |
|---|---|---|---|---|---|---|
| Sample A | PM1 | 70 wt % PP1 | 29 wt % DP2<br>1 wt % DP4 | 80 | 12 | A00B00C00 |
| Sample B | PM2 | 70 wt % PP2 | 29 wt % DP2<br>1 wt % DP4 | 80 | 12 | A00B00C00<br>See FIG. 1 and 2. |
| Sample D | PM4 | 100% wt % PP1 | no | 90 | 12 | A00B00C06-08<br>Poor green strength.<br>See FIG. 7. |
| Sample E | PM5 | 90 wt % PP3 | 10 wt % DP3 | 110 | 13 | About 6 vol %<br>porosity. Open<br>porosity. See FIG. 8. |
| Sample F | PM6 | no | 20% DP1<br>80% DP3 | 80 | 12.3 | About 4 vol %<br>porosity. Open<br>porosity. See FIG. 9. |
| Sample G* | PM7 | 100 wt % PP1 | no | 90 | 9.8 | Open porosity and<br>very inhomogeneous<br>microstructure. See<br>FIG. 10. |

*not subjected to sinter-HIP process

Figure 11:
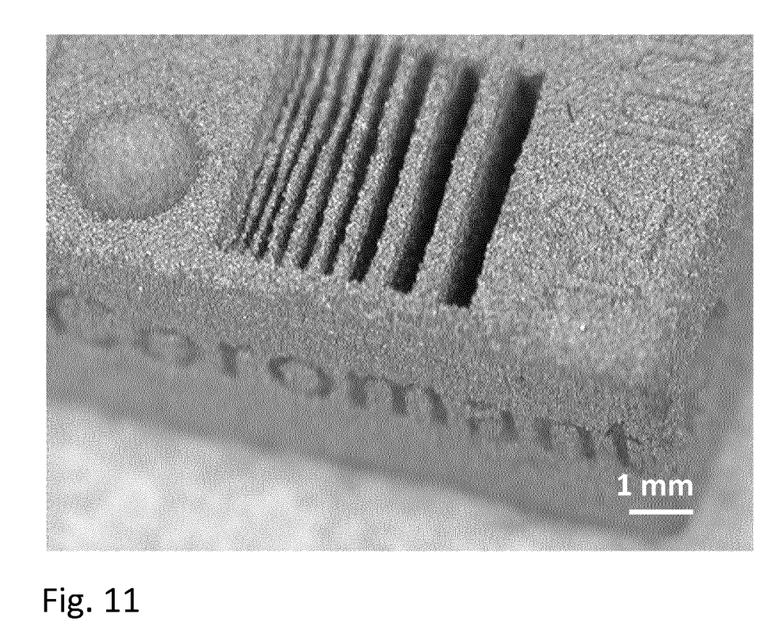
FIG. 11. A LOM (light optical microscope) image of a 3D printed and sintered cemented carbide body.
Figure 12:
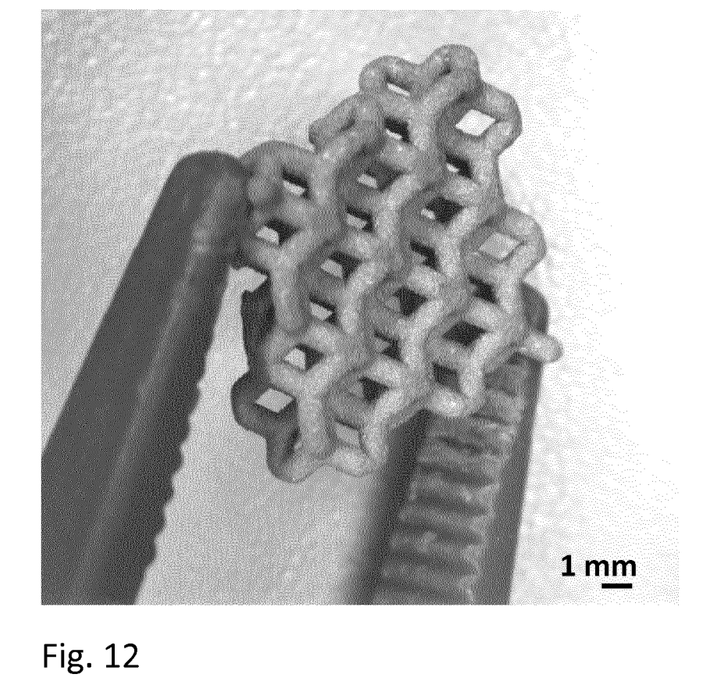
FIG. 12. A LOM (light optical microscope) image of a 3D printed and sintered cemented carbide body.

Examples of three dimensional printed cemented carbide bodies are shown in FIG. 11 and FIG. 12.

While the invention has been described in connection with the various exemplary embodiments, it is to be understood that the invention is not limited to the disclosed exemplary embodiments; on the contrary, it is intended to cover various modifications and equivalent arrangements within the scope of the appended claims.

The invention claimed is:

1. A method of making a cermet or cemented carbide body, said method comprising the steps of:
   mixing a powder of porous cermet and/or cemented carbide particles having a median particle size (D50) of 5-35 µm with a powder of dense cermet and/or cemented carbide particles having a median particle size of (D50) 3-15 µm, to form a powder mixture, wherein the powder mixture includes 65-85 wt % porous particles and 15-35 wt % dense particles;
   three-dimensional (3D) printing a body using said powder mixture and a printing binder to form a three-dimensional (3D) printed cermet or cemented carbide green body; and
   sintering said green body to form a cermet or cemented carbide body.

2. The method in accordance with claim 1, wherein, subsequent to or integrated in the sintering step, further comprising a step of sinter-HIP processing the cermet or cemented carbide body.

3. The method in accordance with claim 1, wherein the three-dimensional printing is a binder jetting.

4. The method in accordance with claim 1, wherein the body is a cutting tool for metallic cutting or a cutting tool for mining application or a wear part.

\* \* \* \* \*